United States Patent [19]

Harmand

[11] Patent Number: 5,788,434
[45] Date of Patent: Aug. 4, 1998

[54] APPARATUS FOR FACING A BEARING CAP

[75] Inventor: Brice Harmand, San Diego, Calif.

[73] Assignee: Harmand Family Limited Partnership, San Diego, Calif.

[21] Appl. No.: 691,516

[22] Filed: Aug. 2, 1996

Related U.S. Application Data

[62] Division of Ser. No. 301,244, Sep. 6, 1994, Pat. No. 5,655,278.

[51] Int. Cl.$^6$ .................................................. B23C 3/10
[52] U.S. Cl. ........................... 409/164; 409/197; 409/225
[58] Field of Search ............................ 409/219, 225, 409/227, 218, 185, 190, 197, 163, 164, 166, 165; 408/87; 82/113, 131, 152

[56] References Cited

U.S. PATENT DOCUMENTS

| | | | |
|---|---|---|---|
| 1,608,659 | 11/1926 | Jensen | 408/54 |
| 3,241,450 | 3/1966 | Morris | 409/163 X |
| 4,066,728 | 1/1978 | Behme | 409/164 X |
| 4,132,494 | 1/1979 | Aldridge, Jr. | 408/54 |
| 4,545,106 | 10/1985 | Juengel | 409/197 X |
| 4,657,446 | 4/1987 | Flaten | 408/87 |
| 4,730,958 | 3/1988 | Banoczky | 408/54 |
| 5,209,615 | 5/1993 | Davis | 408/54 |
| 5,221,165 | 6/1993 | Goszczynski | 408/1 R |
| 5,403,146 | 4/1995 | Jones | 414/783 |

FOREIGN PATENT DOCUMENTS

| | | |
|---|---|---|
| 623253 | 11/1935 | Germany . |
| 650985 | 9/1937 | Germany . |
| 658575 | 3/1938 | Germany . |
| 821580 | 7/1949 | Germany . |
| 62-28102 | 2/1987 | Japan . |
| 62-188609 | 8/1987 | Japan . |

OTHER PUBLICATIONS

Berco—1994 Product Catalog.
Sunnen Products Co.—1994 Product Brochure.
Serv–Equip, Inc.—Ad in Summer 1994 "Engine Rebuilder Trader" Magazine, p. 81.
Dura–Bond—Performance Racing Industry, Sep. 1994.
Acu–Bore—1994 Product Brochure.
Newen Genesys OHC Cylinder Head & Block Line Boring Machine—1995 Product Brochure.

*Primary Examiner*—William R. Briggs
*Attorney, Agent, or Firm*—Brown, Martin, Haller & McClain

[57] ABSTRACT

A method and machine for repairing overhead cam engine cylinder heads and the like. The method includes the steps of removing the caps from the bases of the bearing towers or housings, removing material from the legs of the caps to reduce their height, replacing the caps on the bases, and boring the resulting bearings to produce bearings of the proper diameter. The machine includes a device for machining a bearing cap and a device for boring the bearings. The device for boring the bearings has a boring bar that is supported only at opposite ends of the cylinder head. The bar does not sag or chatter because it is made of an extremely hard and dense material such as a dense tungsten alloy or a ceramic-coated metal.

10 Claims, 3 Drawing Sheets

APPARATUS FOR FACING A BEARING CAP

This is a divisional of application Ser. No. 08/301,244, filed Sep. 6, 1994 U.S. Pat. No. 5,655,278.

BACKGROUND OF THE INVENTION

The present invention relates generally to devices for machining or rebuilding internal combustion engines and, more specifically, to devices for boring engine overhead camshaft cylinder heads.

The cylinder heads of overhead cam engines have bearings for supporting the camshaft. Each bearing is located in a tower that positions the camshaft relative to the cylinder head. The most commonly used type of bearing consists only of the interior surface of the tower. Typically, between two and seven bearings and corresponding towers are distributed along the length of the camshaft in the cylinder head. Each tower comprises a portion that is formed integrally with the remainder of the, cylinder head. In a few types of cylinder heads, the entire tower is integrally formed with the cylinder head. Such a tower completely encircles the camshaft with the inner surface of the tower forming the bearing. However, in most types of cylinder heads, the tower has a base portion formed integrally with the cylinder head. The camshaft is supported between a semicircular bearing surface in the base portion and a corresponding semicircular bearing surface in the cap. The cap is secured to the base portion using two bolts.

The camshaft rotates smoothly so long as the bearings remain aligned along the camshaft axis of rotation. The cylinder head may, however, warp as a result of engine overheating. In addition, the bearings may wear over time as a result of use. Both cylinder head warping and bearing wear may cause the camshaft to vibrate and ultimately may prevent the camshaft from turning at all, or the camshaft bearings may wear so quickly and severely that the oil pressure drops, causing engine failure. Thus, it is apparent that when cylinder head warpage and bearing wear occurs, the camshaft bearings must be repaired in order to avoid costly repairs or engine replacement.

A line boring machine is a device having a table, a rotating steel boring spindle or boring bar, and a motor connected to the bar. The cylinder head is secured to the table, which functions as a reference plane. The boring bar is received horizontally through all the cylinder head bearings.

The boring bar has mounting recesses distributed along its length for receiving cutting bits. One bit is mounted adjacent each tower. The machine also includes a drive mechanism for moving the bar longitudinally along its axis of rotation. The bar is then simultaneously rotated and fed longitudinally. Each cutting bit engages a bearing and removes metal to enlarge the bearing diameter. The cylinder head may then be removed from the machine. So-called "repair bearings," which are annular inserts, usually made of steel, having an inside diameter equal to the proper diameter for the camshaft bearings and an outside diameter approximately equal to the diameter of the newly enlarged bearing, are inserted into the enlarged bearings and are retained by the resulting friction-fit. The camshaft may then be re-inserted through the repair bearings.

The use of repair bearings has several disadvantages. The friction-fit holding the repair bearings may loosen, allowing the repair bearings to rotate with respect to the cylinder head. Such rotation will quickly result in engine failure and require further repairs. In addition, heat conduction between the cylinder head, which is typically aluminum, and the steel repair bearings is poor and may prevent heat generated by the camshaft friction from dissipating properly into the cylinder head. The non-uniform heat distribution and the different coefficients of thermal expansion of the two metals increase the risk of loss of adhesion between the repair bearings and the cylinder head.

The use of the line boring machine described above to repair camshaft bearings creates a problem. The boring bar and its cutting bits must remain precisely axially aligned with the bearings during the process. In prior art line boring machines, the boring bar must be supported because the effect of gravity on the horizontal bar tends to sag or bow downwardly, thereby preventing it from boring along a perfectly straight axis.

Line boring machines attempt to minimize this problem by supporting the bar at multiple points along its length. The line boring machine includes multiple support arms that have bearings in which the bar rotates. When a cylinder head is mounted on the table of the machine, the arms extend between the towers. If the towers are spaced closely together, however, as is common in small engines, insufficient space exists between the towers to accommodate an arm. Moreover, both the distance between the arms and the distance between each arm and the table can be adjusted. It is therefore both time-consuming and difficult to obtain the required alignment among all of the arms.

Another solution that has been attempted involves supporting the boring bar by the two camshaft bearings at the extreme ends of the cylinder head. A bearing ring is inserted into each end bearing, and the boring bar is inserted through the bearing rings. This method is not effective, however, if the end bearings are themselves in poor alignment with each other. When this method is used, the end bearings tend to wear more quickly than the other bearings. Furthermore, the effectiveness of the method decreases with increasing cylinder head length.

These problems and deficiencies are clearly felt in the art and are solved by the present invention in the manner described below.

SUMMARY OF THE INVENTION

The present invention is an apparatus and method for repairing overhead cam engine cylinder heads. The method comprises the steps of removing the caps from the bases of the bearing towers or housings, removing material from the legs of the caps, replacing the caps on the bases, and boring the resulting bearings to produce bearings of the proper diameter. The apparatus comprises a device for machining a bearing cap and a device for boring the bearings.

Each bearing tower comprises a base and a cap. As originally manufactured, the bearing is defined by a semicylindrical surface inside the base and a corresponding semicylindrical surface inside the cap. When the cap is mounted on the base, the resulting bearing is cylindrical.

To remove a cap from its base, the bolts that extend downward through the legs of the cap are removed. The legs are then machined to remove a small amount of material. The present invention comprises a rotary cutting tool mounted on an axially movable carriage, a mounting block, and a suitable drive means such as an electric motor. The mounting block has two prongs or rods extending from it toward the cutting tool. To machine the legs of a cap, the rods are inserted into the bolt holes in the legs of the cap. The motor drives the cutting tool, which is advanced by a feed means such as a second electric motor, toward the bottom surfaces of the cap legs. When a sufficient amount of material has been removed from the cap legs, the cap is removed from the mounting and replaced on the tower base using the bolts.

When the cap is replaced on the tower base, the resulting bearing is asymmetrical because the portion of the bearing defined by the cap is no longer semicylindrical. The bearing is then bored to the diameter specified by the manufacturer, thereby restoring the cylindrical shape without requiring the insertion of repair bearings.

The present invention also comprises a line boring device that may be used for boring the bearings. The device has a boring bar that is supported only at opposite ends of the workpiece, i.e., the cylinder head. There are no intermediate arms for supporting the boring bar. Yet the boring bar does not sag or chatter because it is made of an extremely stiff, hard and dense material, preferably a dense tungsten alloy such as DENAL™ or a ceramic-coated metal. The high density and/or ceramic coating minimizes vibration. The boring bar receives cutting bits at multiple locations along its length. The device has a drive means, such as an electric motor, for rotating the bar. A feed means, such as a second electric motor, advances the bar in an axial direction, thereby engaging each cutting bit with one of the bearings. All bearings may thus be bored simultaneously.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF PREFERRED EMBODIMENTS

Figures 1, 2, 3, 4:
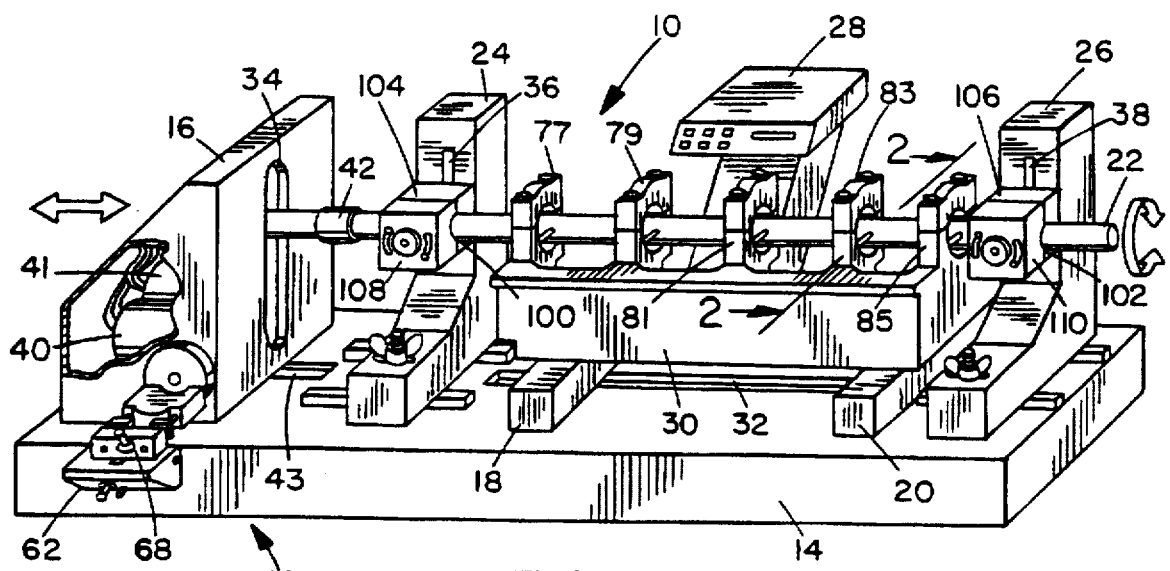
FIG. 1 is a perspective view of a machine for boring multiple axially aligned bearings and for machining bearing caps, showing an overhead cam engine cylinder head mounted on the boring device and a bearing cap mounted on the cap machining device.
FIG. 2 is a sectional view taken on line 2—2 of FIG. 1.
FIG. 3 is a sectional view of the boring bar taken on line 3—3 of FIG. 2.
FIG. 4 is a sectional view of the boring bar taken on line 4—4 of FIG. 3.

As illustrated in FIG. 1, the present invention comprises a line boring machine 10 and a bearing cap machine 12. As described in further detail below, both machines 10 and 12 are powered by a common drive means.

Line boring machine 10 has a base 14, a drive housing 16, two workpiece mounts 18 and 20, a boring bar 22, two boring bar supports 24 and 26 and an electronic controller 28. A workpiece 30, such as an overhead cam engine cylinder head, may be mounted on workpiece mounts 18 and 20. A horizontal mount slot 32 that engages a portion of mounts 18 and 20 facilitates adjustment of the horizontal or axial position of mounts 18 and 20. Similarly, vertical bar slots 34, 36 and 38, in drive housing 16, support 24 and support 26, respectively, facilitate adjustment of the vertical position of boring bar 22.

Boring bar 22 is supported only by supports 24 and 26. Boring bar 22 is made of an extremely rigid and dense material, such as tungsten alloys having greater than 91% tungsten content. Typically the desired materials will have a modulus of elasticity on the order of 1.5 or more times that for a high strength steel. A preferred material is produced by the Cime Bocuze Company of Lyon, France under the trade name DENAL™. DENAL™ is a tungsten-nickel-iron alloy which increases in density and modulus of elasticity with increased tungsten content while showing little change in hardness. The preferred grade of DENAL™ has a density of between 17.6 and 18.5 g/cm$^3$, a hardness of between 300 and 490 Hv, and a modulus of elasticity of between 1000 and 1350 MPa (145,000 psi–197,750 PSI). The use of DENAL™ in the prior art is believed to be almost exclusively for armor penetrators in military ordnance. It has been determined in the present invention that the same properties of extreme rigidity and density that render DENAL™ useful for military ordnance are useful in boring bars for minimizing sagging and the resulting vibration. When made of such a material, boring bar 22 will sag no more than 0.02 mm between supports spaced approximately 90 cm apart. Another suitable material that minimizes vibration in a boring bar is steel coated with a ceramic material. The ceramic coating imparts a sufficient degree of hardness and rigidity to the steel that it approximates the properties of the DENAL™.

Two electric motors 40 and 41 are disposed in drive housing 16. Motor 40 rotates boring bar 22 via a homokinetic coupling 42. Motor 40 may drive coupling 42 either directly or via suitable gearing (not shown) in drive housing 16. Motor 41 moves drive housing 16, which rides on a track or slot 43, in an axial or longitudinal direction. Boring bar 22 is, in turn, fed in the axial direction. Controller 28 controls these actions in response to commands entered by an operator. Controller 28 preferably maintains a rate of axial movement or feed rate that varies linearly with rotation speed. An operator may select a rotation speed, e.g., 600 RPM, and a feed distance per revolution, e.g., 0.02 mm per revolution. If the operator thereafter selects a different rotation speed, e.g., 400 RPM, controller 28 automatically adjusts the feed rate (from 12 mm/min. to 8 mm/min. in the present example) to maintain the selected feed distance per revolution. Persons of skill in the art will readily be capable of designing suitable electronics, including microprocessors and associated software or other computer components, to control motor speed and feed rate in the manner described above.

As illustrated in FIGS. 2–4, boring bar 22 has multiple cutting bit mounting bores 44 distributed along its length. Each mounting bore 44 has a countersunk recess 46 at its upper end. Recesses 46 function as reference planes because all are located at precisely the same distance from the axis of rotation of boring bar 22. A carbide-tipped cutting bit 48 is disposed in one of mounting bores 44. A collar 50, disposed around cutting bit 48, facilitates measurement of the distance that cutting bit 48 extends with respect to recess 46. A set screw 52 disposed in a threaded bore in boring rod 22 perpendicular to cutting bit 48 retains cutting bit 48 in rod 22.

Figure 5:
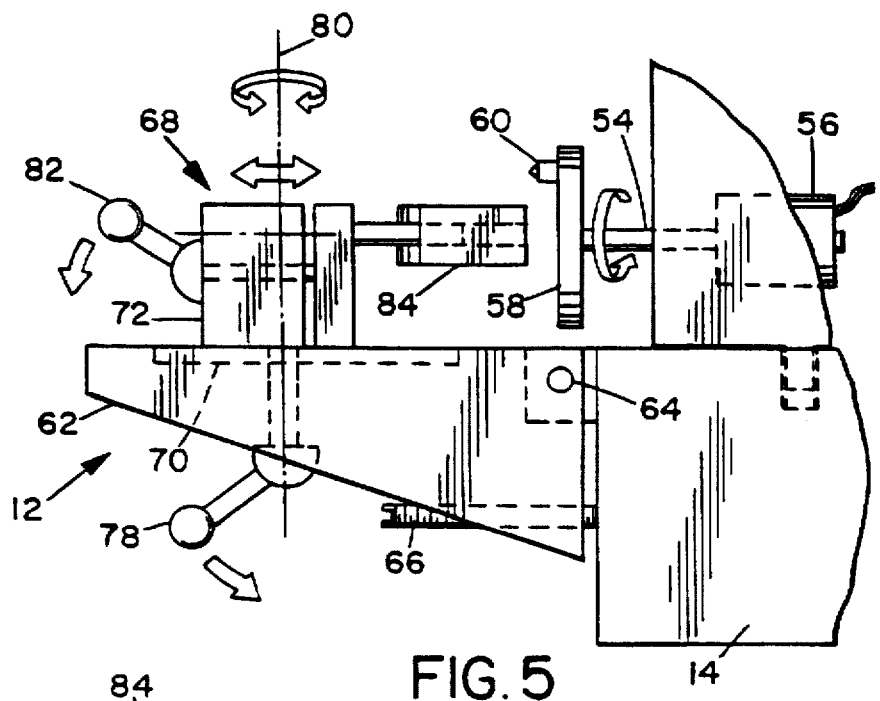
FIG. 5 is a side elevation view of the device for machining bearing caps.

FIG. 5 illustrates bearing cap machine 12 in further detail. A drive shaft 54 is rotated by a third motor 56. Controller 28 controls the rotation speed of drive shaft 54 in the manner described above with respect to boring bar 22. A cutting wheel 58 is connected to the end of drive shaft 54. A carbide-tipped cutting bit 60, mounted on cutting wheel 58 at a suitable radius, rotates with shaft 54. A "L"-shaped brace 62 is mounted to base 14 with a pivot pin 64. An adjusting screw 66 extends through a threaded bore below pivot pin 64 and contacts base 14. An operator may thus adjust the pivot angle of brace 62 with respect to base 14 by rotating adjusting screw 66.

A cap mount 68 on the upper surface of brace 62 slides toward and away from cutting wheel 58 along a track or slot 70. Cap mount 68 comprises a cap block 72 and two arms 74, each having a rod 76 extending therefrom toward cutting wheel 58. The distance between arms 74 is adjustable by sliding them apart or toward one another. Pivoting a handle 78 in the direction indicated by the arrow in FIG. 5 draws arms 74 toward cap block 72 and locks arms 74 in position at the selected separation distance. Similarly, the angular orientation of cap mount 68 with respect to a vertical axis 80 can also be adjusted by rotating cap mount 68 to a selected orientation and then pivoting a handle 82 in the direction indicated by the arrow in FIG. 5 to lock cap mount 68 down against the surface of brace 62.

Figure 6:
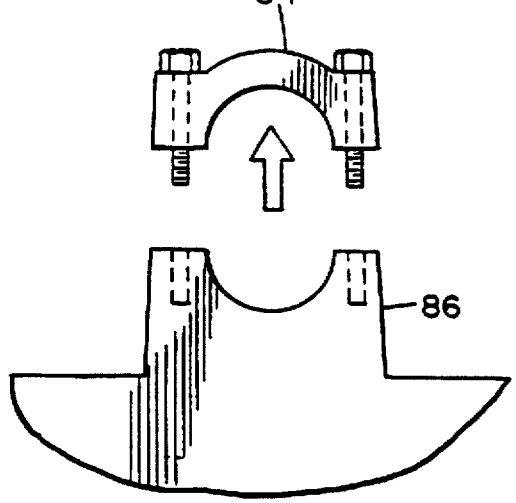
FIG. 6 is a side elevation view of a bearing tower, showing removal of the cap.
Figure 7:
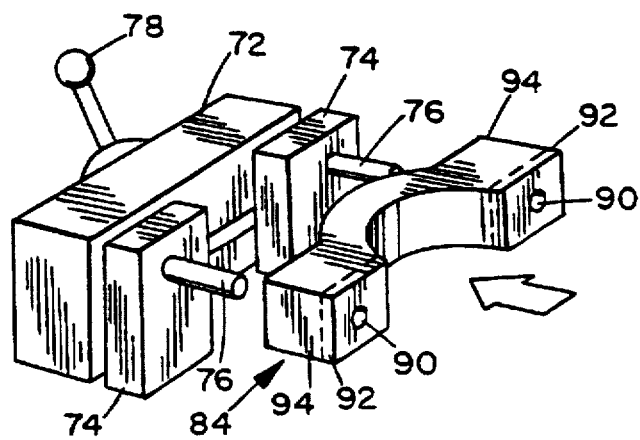
FIG. 7 is a perspective view of a portion of the device for machining bearing caps, showing a cap mounted on the device prior to machining the cap legs.

FIGS. 6-9 illustrate a method for repairing an overhead cam engine cylinder head using the apparatus described above. As illustrated in FIG. 6, a bearing cap 84 is removed from the base 86 of one of bearing housings or towers 77, 79, 81, 83 and 85 (FIG. 1) by removing two bolts 88. As illustrated in FIG. 7, cap 84 is mounted on cap mount 68 by inserting rods 76 into the bolt holes 90 of cap 84. The separation distance between rods 76 may be adjusted as described above to accommodate the dimensions of cap 84. It is important to assure that the bottom faces of the cap legs 94 are perpendicular to the cutting tool 58. This perpendicular alignment is facilitated by inserting the two rods 76 through bolt holes 90.

A thickness 92 of material is removed from each leg 94 of cap 84 using bearing cap machine 12. In response to commands entered by an operator, controller 28 starts motors 41 and 56. As described above, motor 41 advances drive housing 16. Cutting wheel 58, which is connected to drive housing 16 and is rotated by motor 56 inside drive housing 16, advances with drive housing 16. The rotating cutting bit 60 is thus moved into contact with legs 94 of cap 84 by the forward motion of drive housing 16. Controller 28 stops motors 41 and 56 in response to operator commands when machining of legs 94 is completed. Cap 84 is then removed from cap mount 68 and replaced on base 86 of the bearing tower using bolts 88. All of the bearing caps of the cylinder head are machined and re-mounted on bearing towers 77, 79, 81, 83 and 85 in this manner.

Figure 8:
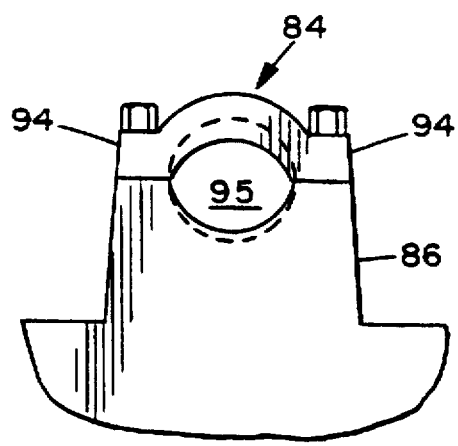
FIG. 8 is a side elevation view of a bearing tower, showing a cap re-mounted on the tower base following machining of the cap legs.

As illustrated in FIG. 8, the resulting bearing 95 is asymmetrical due to the reduced lengths of legs 94 and the arcuate bearing surface inside cap 84. (It should be noted that the figures are not drawn to scale, and the asymmetry is exaggerated for illustrative purposes.)

Line boring machine 10 may be used to bore bearing 95 as indicated in dashed line in FIG. 8. The cylinder head, i.e., workpiece 30, is mounted on workpiece mounts 18 and 20 of line boring machine 10. Boring bar 22 is received through the bearing towers and through supports 24 and 26 and secured to coupling 42. To aid aligning supports 24 and 26 with respect to boring bar 22, an arcuate or semicylindrical insert 96, shown in FIG. 2, may be inserted in the end bearing tower 85. Insert 96 has an outer diameter equal to that of the bearing and an inner diameter equal to that of boring bar 22. Insert 96 may be removed from beneath boring bar 22 after it has been aligned and supports 24 and 26 have been secured.

Figure 9:
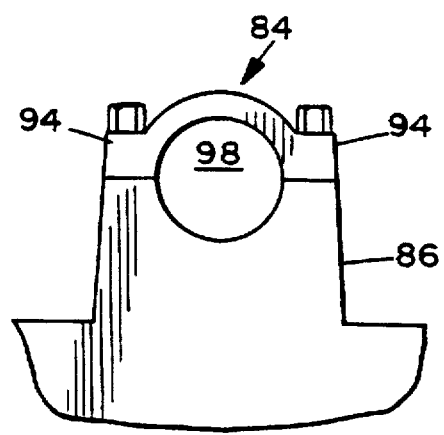
FIG. 9 is a side elevation view of the bearing tower of FIG. 8 following boring.

Cutting bits 48 are secured in mounting bores 44 as described above. A cutting bit 48 may disposed adjacent each tower, as shown in FIG. 1. In response to commands entered by an operator, controller 28 starts motors 40 and 41. As described above, motor 40 rotates boring bar 22 and motor 41 advances drive housing 16 to feed boring bar 22 at the selected feed rate. Material is removed as cutting bits 48 contact the bearings. All bearings can thus be bored simultaneously, however, this arrangement also allows the bearings to be bored one at a time. Cutting bits 48 should be adjusted to remove material to a depth that results in a bearing 98 having the diameter specified by the engine manufacturer, as illustrated in FIG. 9.

The novel method for repairing overhead cam engine cylinder heads is economical because it avoids the use of repair bearings. Moreover, it eliminates heat dissipation problems and other problems associated with the use of repair bearings. The present invention is also economical because the cutting tool feed for both line boring machine 10 and bearing cap machine 12 is provided by a common drive mechanism and because no intermediate supports are necessary to prevent sagging in boring bar 22. Furthermore, the present invention can be quickly and easily set up because there are no intermediate supports to align.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. An apparatus for removing material from a bearing cap having a bearing surface and two flange surfaces lying in a flange plane on either side of said bearing surface, each said flange surface having a bore, said apparatus comprising:

a base;

a carriage slidably connected to said base;

a drive shaft having an axis of rotation;

a cutting tool connected to an end of said drive shaft, said cutting tool rotating with said drive shaft in a cutting plane;

first drive means connected to said carriage and another end of said drive shaft for rotating said drive shaft;

second drive means connected to said carriage for moving said carriage in a direction perpendicular to said axis of rotation; and a cap mounting connected to said base having two rods for engaging said bores with said flange surfaces adjacent said cutting tool.

2. The apparatus claimed in claim 1, further comprising a linkage connected to said base and said cap mounting for adjusting an angle between said flange plane and said cutting plane.

3. The apparatus claimed in claim 1, wherein said linkage comprises:

a "L"-shaped brace having two arms pivoting about a pivot point, said pivot point having an axis perpendicular to said axis of rotation; an adjusting screw threadably mounted in a bore in one said arm, said adjusting screw contacting said base.

4. The apparatus claimed in claim 1, wherein said cutting tool comprises:

a circular disk having a center connected to said end of said drive shaft; and a bit mounted on a face of said circular disk adjacent said cap mounting.

5. An apparatus for reducing a height of a bearing cap having a semi-circular bearing surface and two flange surfaces lying in a flange plane on either side of said bearing surface, each flange surface having a bore therethrough, the plurality of bores extending through the bearing cap perpendicular to the flange plane and being spaced apart at a pre-determined bore spacing, the apparatus comprising:

a first support surface;

a first drive means mounted on the first support surface, the first drive means generating a rotational force;

a drive shaft having a first-end and a second end, the first end being attached to the first drive means so that the drive shaft rotates with the first drive means;

a surfacing tool disposed at the second end of the drive shaft for rotating in a cutting plane to remove material from the flange surfaces when the flange surfaces are placed in contact with the surfacing tool;

a second support surface disposed adjacent the first support surface, one of the first support surface and the second support surface being slidable with respect to the other support surface so that the first support surface and the second support surface can moved toward and away from each other and perpendicular to the cutting plane;

a cap mounting disposed on the second support surface and having means for holding the bearing cap so that the flange surfaces are presented to the surfacing tool; and second drive means connected to the slidable support surface of the first support surface and the second support surface to move the slidable support surface in a direction perpendicular to said axis of rotation;

wherein the second drive means moves the flange surfaces and the surfacing tool into contact with each other so that the surfacing tool removes a pre-determined amount of material from the flange surfaces so that the height of the bearing cap is reduced and the semi-circular bearing surface is truncated.

6. The apparatus claimed in claim 5, further comprising a plurality of rods extending from the cap mounting toward the cutting plane, the plurality of rods having a rod spacing corresponding to the bore spacing of the bearing cap and each rod of the plurality of rods having an outer diameter adapted for fitting within the plurality of bores.

7. The apparatus claimed in claim 6, wherein the rod spacing is variable for accomodating a plurality of different bore spacings.

8. The apparatus claimed in claim 5, further comprising a linkage connected to the first surface and the second surface for adjusting an angle between the flange plane and the cutting plane.

9. The apparatus claimed in claim 8, wherein the linkage comprises:

a "L"-shaped brace having two arms pivoting about a pivot point, the pivot point having an axis perpendicular to the drive shaft;

an adjusting screw threadably mounted in a bore in one of the two arms, the adjusting screw contacting the first support surface.

10. The apparatus claimed in claim 5, wherein the surfacing tool comprises:

a circular disk mounted concentrically on the first end of the drive shaft; and a cutting bit mounted on a face of the circular disk extending outward from the drive shaft.

* * * * *